*J. W. Dayton,*
*Harness Rosette.*
No. 103,849.           Patented June 7, 1870.
Fig. 1.
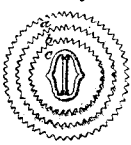
Fig. 2.      Fig. 3.      Fig. 4.
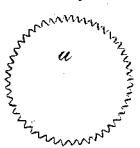    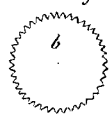    
Fig. 5.
Witnesses:
John W. Dayton,
Assignor to American Suspender Co.
Inventor
By Attorney

United States Patent Office.

JOHN W. DAYTON, OF WATERBURY, CONNECTICUT, ASSIGNOR TO THE AMERICAN SUSPENDER COMPANY, OF SAME PLACE.

Letters Patent No. 103,849, dated June 7, 1870.

IMPROVEMENT IN ROSETTES.

The Schedule referred to in these Letters Patent and making part of the same.

To all whom it may concern:

Be it known that I, JOHN W. DAYTON, of Waterbury, in the county of New Haven and State of Connecticut, have invented a new Improvement in Rosettes; and I do hereby declare the following, when taken in connection with the accompanying drawings and the letters of reference marked thereon, to be a full, clear, and exact description of the same, and which said drawings constitute part of this specification, and represent in—

Figure 1, a top view;

Figures 2, 3, and 4, the different layers of which the rosette is composed; and in Figure 5, the manner of uniting the several layers.

This invention relates to an improvement in the construction of rosettes for shoes, and for other purposes.

These rosettes have heretofore been made from ribbon or other material easily injured by wet or wear.

My invention consists in the production of a rosette, as a new article of manufacture, from layers or thicknesses of felt, the edges cut or ornamented in any desirable manner.

To form the rosette as seen in fig. 1, I cut from felt the three pieces $a\ b\ c$, diminishing in size, and the edge ornamented or shaped in any desirable manner, then place one piece over another, until the several thicknesses are properly arranged, and secure them together by any desirable ornament upon the outer surface, preferring one on which prongs are formed upon the under side, so as to pass through the several thicknesses, and the prongs bent down, and the same are used to secure the rosette to whatever it is desired to attach it.

I claim as my invention—

As a new article of manufacture, a rosette formed from felt, substantially in the manner described.

JOHN W. DAYTON.

Witnesses:
J. H. SHUMWAY,
A. J. TIBBITS.